United States Patent [19]

Toda

[11] Patent Number: 5,386,110

[45] Date of Patent: Jan. 31, 1995

[54] METHOD OF MAKING CANTILEVER CHIP FOR SCANNING PROBE MICROSCOPE

[75] Inventor: Akitoshi Toda, Tokyo, Japan

[73] Assignee: Olympus Optical Co., Ltd., Tokyo, Japan

[21] Appl. No.: 104,375

[22] Filed: Aug. 9, 1993

Related U.S. Application Data

[62] Division of Ser. No. 872,895, Apr. 23, 1992, Pat. No. 5,264,696.

[30] Foreign Application Priority Data

| May 20, 1991 | [JP] | Japan | 3-115068 |
| May 20, 1991 | [JP] | Japan | 3-115069 |
| Apr. 16, 1992 | [JP] | Japan | 4-96404 |

[51] Int. Cl.[6] ............................................. G01B 7/34
[52] U.S. Cl. ................................ 250/216; 250/234; 250/306; 156/647; 437/225
[58] Field of Search ............... 250/234, 216, 306, 307; 437/225, 228, 974; 156/643, 644, 647, 657, 659.1, 662

[56] References Cited

U.S. PATENT DOCUMENTS

| Re. 33,387 | 10/1990 | Binning | 250/306 |
| 5,021,364 | 6/1991 | Akamine et al. | 250/306 X |
| 5,051,379 | 7/1991 | Bayre et al. | 250/304 X |
| 5,066,358 | 11/1991 | Quate et al. | 250/306 X |
| 5,129,132 | 7/1992 | Zdeblick et al. | 156/643 |
| 5,149,673 | 9/1992 | MacDonald et al. | 437/192 |
| 5,193,385 | 3/1993 | Nishioka et al. | 250/306 X |
| 5,248,912 | 9/1992 | Zdeblick et al. | 310/332 |
| 5,264,696 | 11/1993 | Toda | 250/234 |
| 5,266,502 | 11/1993 | Okada et al. | 437/24 |
| 5,282,924 | 2/1994 | Bayer et al. | 156/643 |

FOREIGN PATENT DOCUMENTS

| 0413041A1 | 8/1989 | European Pat. Off. |
| 0413042A1 | 8/1989 | European Pat. Off. |
| 4016472A1 | 11/1991 | Germany |
| 62-4124090A1 | 1/1992 | Germany |
| 4124090A1 | 1/1992 | Germany |
| 62-130302 | 6/1987 | Japan |

1210116 2/1986 U.S.S.R.

OTHER PUBLICATIONS

Article entitled "Microfabrication Of Cantilever Styli For The Atomic Force Microscope" by T. R. Albrecht, et al, published in J. Vac. Sci Technol. A 8(4), Jul./Aug. 1990, pp. 3386–3396.

Article entitled "Silicon As A Mechnaical Material" by Petersen published in Proceedings of IEEE, vol. 70, No. 5, May, 1982, pp. 443–450.

Article entitled "High Resolution Pressure Sensor Fabricated By Silicon Wafer Direct Bonding" by C. S. Chung, published in Electronics Letters, vol. 27, No. 12, Jun. 6, 1991, pp. 1098–1100.

J. Appl. Phys. 62(7), Oct. 1, 1987, pp. 2599–2602, 1987 American Institute of Physics.

Appl. Phys. Lett. 57(3), Jul. 16, 1990, pp. 316–318, 1990 American Institute of Physics.

Artile entitled "Micromachining And Micropackaging Of Transducers" by C. D. Fung, et al, published in Studies in Electrical and Electronic Engineering 20, Elsevier, Amsterdam–oxford–New York–Tokyo 1985, title page and pp. 114–124.

Primary Examiner—David C. Nelms
Assistant Examiner—John R. Lee
Attorney, Agent, or Firm—Frishauf, Holtz, Goodman & Woodward

[57] ABSTRACT

A method of making a cantilever chip for a scanning probe microscope wherein the cantilever chip includes a cantilever portion, a probe portion formed at a free end of the cantilever portion, a mirror portion formed on the cantilever portion on a side opposite to a side where the probe portion is formed, and a support portion for supporting the proximal end of the cantilever portion. A step is formed between the cantilever portion and the support portion, so that the support portion is set back from the surface of the cantilever portion on the side where the probe portion is formed. Semiconductors manufacturing processes and etching processes are used.

18 Claims, 11 Drawing Sheets

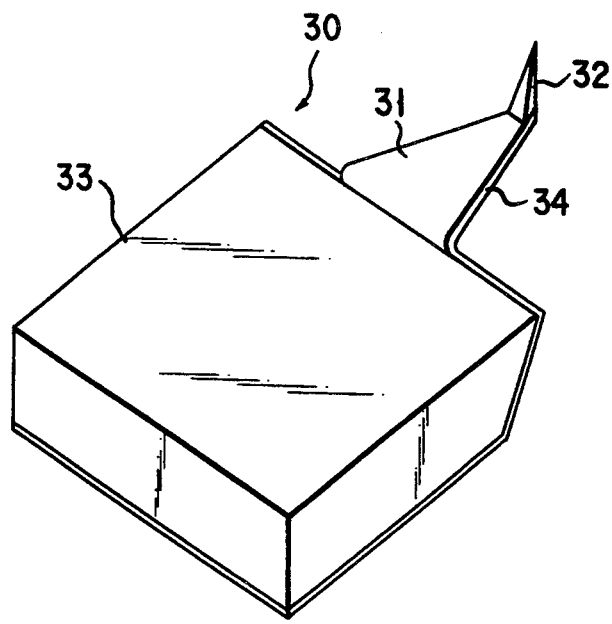
F I G. 1
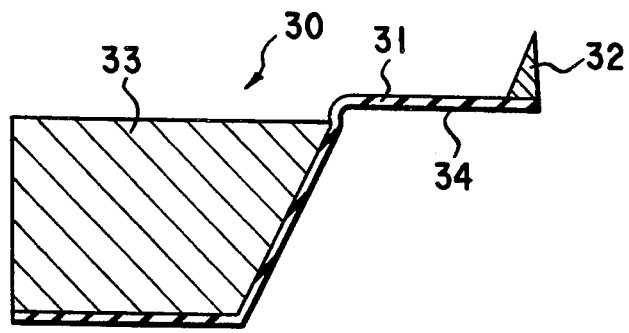
F I G. 2

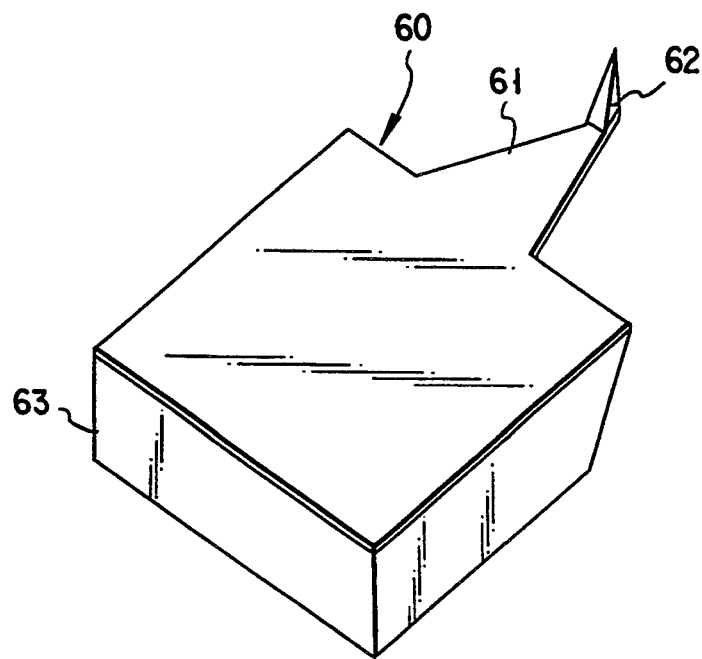
F I G. 15
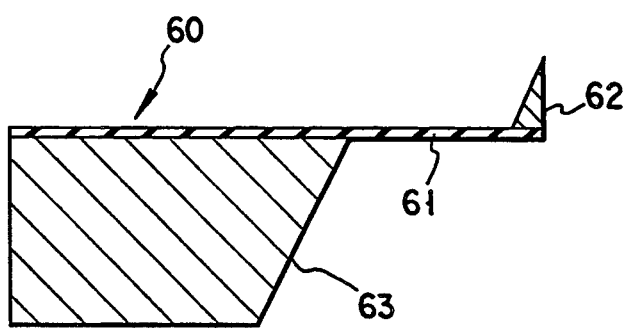
F I G. 16

METHOD OF MAKING CANTILEVER CHIP FOR SCANNING PROBE MICROSCOPE

This is a division of application Ser. No. 07/872,895 filed Apr. 23, 1992 now U.S. Pat. No. 5,264,696.

BACKGROUND OF THE INVENTION

1. Field of the Invention

The present invention relates to a cantilever chip for a scanning probe microscope and, more particularly, to a method of making a cantilever chip of this type having a lever portion and a probe portion formed at the free end of the cantilever portion.

2. Description of the Related Art

Published Unexamined Japanese Patent Application No. 62-130302 (filed by IBM, G. Wienisch) entitled "Method and Apparatus for forming an image of a sample surface" proposes an atomic force microscope (AFM) as a microscope which utilizes techniques including a servo technique of a scanning tunneling microscope (STM) invented by Binning, Rohrer, et al. and which can observe an insulating material on an atomic order, which is difficult with the STM.

The structure of the AFM is similar to that of the STM, and the AFM is evaluated as one of the scanning probe microscopes. In the AFM, a cantilever chip having a sharp projecting portion (probe portion) at its free end is disposed close to a sample to oppose it. The sample is scanned in the X and Y directions while the movement of the cantilever chip which is displaced by a mutual force acting between the atoms in the distal end of the probe portion and the atoms in the sample is electrically or optically measured, and the positional relationship between the sample and the probe portion of the cantilever chip is changed relatively to each other, thereby obtaining surface shape information and the like of the sample in the three-dimensional manner.

Since T. R. Albrecht et al. have proposed an SiO$_2$ cantilever chip by applying a semiconductor IC manufacturing process (Thomas R. Albrecht, Calvin F. Quate: Atomic resolution imaging of a nonconductor by Atomic force Microscopy J. Appl. Phys. 62 (1987) 2599), the Cantilever chip for a scanning probe microscope has been able to be manufactured with excellent reproducibility and a high precision on the order of μm. An inexpensive cantilever chip can be manufactured in accordance with the batch process. Accordingly, this cantilever chip manufactured by applying the semiconductor IC manufacturing process is most popular.

S. Akamine et al. propose a cantilever chip with a probe portion having a sharp chip distal end of less than 40 nm which is manufactured by applying the semiconductor IC manufacturing process (S. Akamine, R. C. Barrett, and C. F. Quate: Improved atomic force microscope images using microcantitlevers with sharp tips, Appl. Phys. Lett. 57(3), 1990, p. 316). FIG. 12 is a perspective view of a cantilever chip for a scanning probe microscope, and FIG. 13 is a longitudinal sectional view of the same. A cantilever chip 10 is manufactured using a silicon wafer as the starting material, and mainly has a cantilever portion 11 made of silicon nitride, a probe portion 12 made of silicon, and a support portion 13 made of silicon.

FIGS. 14A to 14H show a method of manufacturing this cantilever chip.

A silicon wafer 21 having a surface orientation of (100) with its two surfaces being polished is used (FIG. 14A), and silicon nitride films 22 and 23 are formed on its two surfaces. The silicon nitride film 23 on the lower surface is patterned by photolithography, and anisotropic etching is performed by an aqueous potassium hydroxide solution using the remaining silicon nitride film as the mask. As a result, the thickness of the silicon wafer 21 is decreased to obtain a membrane 24 (FIG. 14B).

Subsequently, a silicon nitride film 25 is deposited on the lower surface of the wafer 21. A resist 26 is formed to coat the upper surface of the wafer 21 and patterned by photolithography (FIG. 14C). Using the resist 26 as the mask, reactive ion etching (RIE) is performed to form a through hole through the film 22, the membrane 24 and the film 25, and then the resist 26 is removed (FIG. 14D). FIG. 14E schematically shows the resultant wafer viewed obliquely from the above.

An oxide film 27 is formed by oxidation on a silicon surface which has been exposed when RIE was performed to form the through hole through the membrane 24 as described above. The silicon nitride film 22 on the surface of the wafer 21 is removed by plasma etching, and anisotropic wet etching is performed by an aqueous potassium hydroxide solution. Etching is stopped by the silicon oxide film 27 and the silicon nitride film 25 (FIG. 14G). Finally, the silicon oxide film 27 is removed by hydrofluoric acid to obtain the cantilever chip 10 for a scanning probe microscope which has a tetrahedral probe portion as shown in FIG. 12 (FIG. 14H).

According to this manufacturing method, when the cantilever portion of a cantilever chip is formed to have a triangular free end, a probe portion is automatically formed on the distal end portion of the free end. In other words, the probe portion can be formed by so-called self alignment. Accordingly, the pattern of the probe portion need not be aligned or exposed separately, and the cantilever chip can be manufactured with high precision.

In the conventional process described above, since etching rate control of wet etching is difficult, it is difficult to set the membrane 24 to have a predetermined thickness by wet-etching the silicon wafer 21 from the lower surface, posing a problem in this process. Hence, an improvement is demanded.

The length of the distal end portion of a cantilever chip is determined by the thickness of the membrane. Accordingly, when a plurality of cantilever chips are to be formed in the same wafer, if the surface distribution of the thickness of the membrane is large, the lengths of the probe portions of the respective cantilever chips differ depending on the thicknesses of the membranes.

The length of the probe portion influences the reproducibility of the surface shape of the sample of an AFM image. If the length of the probe portion is excessively large, a moment applied on the probe portion upon reception of a force perpendicular to the axial direction of the probe portion becomes large, and the AFM image does not correctly reproduce the surface shade of the sample. From these reasons, it is demanded to manufacture a plurality of cantilever chips having probe portions with sharp distal ends and the same probe portion length by the batch process, and to provide a method of manufacturing the same.

In the conventional process described above, a silicon wafer having an orientation of (100) is used as a starting wafer. Thus, the tetrahedral probe portion formed at the free end of the conventional cantilever portion shown in FIG. 12 consists of a (111) plane 15, a surface 16 contacting the cantilever portion, and side surfaces 17 and 18 formed in accordance with the steps shown in FIGS. 14E to 14H. Since the shape of the probe portion is determined by only the thickness of the membrane 24 in FIG. 14B, only the same probe portions can be formed when a plurality of cantilever chips are formed on the same wafer.

A demand has arisen from the users of a scanning probe microscope to selectively use different shapes of the probe portions in order to measure samples having various shapes. For example, the users wish to selectively use probe portions having different aspect ratios. In this case, an aspect ratio is a ratio of the height of, e.g., a probe portion to the typical length of a surface contacting a cantilever portion.

Regarding this demand, conventionally, an angle defined by the two side surfaces (17 and 18 in FIG. 12A) of a probe portion can be arbitrarily determined by the design of the mask for photolithography. However, an angle defined by the (111) plane 15 and the surface 16 contacting the cantilever portion is always 54.74°.

Further, since the conventional process described above also includes the initial step of forming a membrane (FIG. 14B), the wafer can cause cracking easily in a later step, resulting in a low yield. Since a great deal of attention need be paid during wafer handling, a time required for the manufacture is prolonged, and thus an increase in cost is inevitable.

In the conventional cantilever chip, since the cantilever portion is constituted by a silicon nitride film, the thickness of the cantilever portion can only be set to a maximum of 1 μm. Therefore, it is difficult to form a cantilever portion having a large spring constant.

SUMMARY OF THE INVENTION

It is, therefore, an object of the present invention to provide a cantilever chip having stable quality by using a wafer having an etching stop layer as the starting material to solve the problem in wet etching.

It is another object of the present invention to provide a cantilever chip for a scanning probe microscope, in which one or more cantilever portions and probe portions are provided on each of two sides of one support portion, and the probe portions formed at the free ends of the respective cantilever portions have different aspect ratios.

It is still another object of the present invention to allow a user of a scanning probe microscope who performs measurement using this cantilever chip to select a probe portion having a desired aspect ratio.

It is still another object of the present invention to prevent the wafer from cracking during the manufacture, thereby increasing the yield of the cantilever chip.

It is still another object of the present invention to provide a cantilever chip having a cantilever portion of a large spring constant.

In a first aspect of the present invention, there is provided a cantilever chip for a scanning probe microscope, comprising: a cantilever portion; a probe portion formed at a free end of the cantilever portion; and a support portion for supporting a proximal end of the cantilever portion, wherein a step is formed between the cantilever portion and the support portion so that the support portion is set back from a surface of the cantilever portion on the side where the probe portion is formed.

In a second aspect of the present invention, there is provided a cantilever chip for a scanning probe microscope, comprising: first and second cantilever portions; first and second probe portions formed at free ends of the first and second cantilever portions, respectively; and a support portion for supporting proximal ends of the first and second cantilever portions, wherein the first and second probe portions have different aspect ratios.

In a third aspect of the present invention, there is provided a method of manufacturing a plurality of cantilever chips for a scanning probe microscope simultaneously, each of the cantilever chip comprising a cantilever portion, a probe portion formed at a free end of the cantilever portion, and a support portion for supporting a proximal end of the cantilever portion, the method comprising the steps of: preparing a starting wafer, the starting wafer including an etching stop layer, a first semiconductor layer bonded to an upper surface of the etching stop layer, and a second semiconductor layer bonded to a lower surface of the etching stop layer; etching part of the second semiconductor layer of the wafer until reaching the etching stop layer, and decreasing a thickness of a portion of the wafer corresponding to the etched portion to fabricate a membrane; etching and removing an exposed part of the etching stop layer; depositing a constituent material of the cantilever portion on an exposed portion of the first semiconductor layer which is exposed by removing part of the etching stop layer, and part of the second semiconductor layer on two sides thereof, thereby forming a prospective cantilever portion layer; patterning part of a resultant structure to form a hole extending through the membrane; oxidizing a surface portion of the second semiconductor layer exposed in the hole to form an oxide film; etching the first semiconductor layer until etching is stopped by the prospective cantilever portion layer and the oxide film, thereby forming a needle-like portion on the prospective cantilever portion layer; and removing said oxide film.

In a forth aspect of the present invention, there is provided a method according to the third aspect, wherein: the first semiconductor layer is made of a monocrystalline layer or a doped monocrystalline layer. and a surface orientation of the first semiconductor layer is inclined from a plane; and the cantilever chip thus fabricated comprises first and second cantilever portions, first and second probe portions formed at free ends of the first and second cantilever portions, respectively, and one support portion for supporting proximal ends of the first and second cantilever portions, wherein the first and second probe portions have different aspect ratios.

In a fifth aspect of the present invention, there is provided a method of manufacturing a plurality of cantilever chips for a scanning probe microscope simultaneously, each of the cantilever chips comprising a cantilever portion, a probe portion formed at a free end of the cantilever portion, and a support portion for supporting a proximal end-of the cantilever portion, the method comprising the steps of: preparing a starting wafer, the starting wafer including an etching stop layer, a first semiconductor layer bonded to an upper surface of the etching stop layer, and a second semiconductor layer bonded to a lower surface of the etching stop layer; etching part of the first semiconductor layer and part of the etching stop layer of the wafer from an upper surface until reaching the second semiconductor layer, thereby forming a hole extending through the first semiconductor layer and the etching stop layer;

forming an oxide film on surfaces of the first and second semiconductor layers exposed in and out of the hole; removing the oxide film except for part thereof formed in the hole; etching part of the second semiconductor layer from a lower surface until reaching the etching stop layer to decrease a thickness of a portion of the wafer corresponding to the hole, thereby fabricating a membrane; etching the first semiconductor layer until etching is stopped by the etching stop layer and the oxide film, thereby forming a needle-like portion on the etching stop layer; and removing the oxide film.

In a cantilever chip according to the first aspect of the present invention, since a step is formed between a cantilever portion and a support portion on a side facing a sample to be measured, contact between the sample and the support portion is decreased.

In a cantilever chip according to the second aspect of the present invention, since more than one pair of cantilever portion and a probe portion are provided on one cantilever chip and the respective probe portions have different aspect ratios, a probe portion having a desired aspect ratio can be selectively used.

In a method of manufacturing a cantilever chip according to the third aspect of the present invention, etching which determines the lengths of the probe portion and cantilever portion can be reliably stopped at a predetermined position, thus forming a plurality of cantilever chips having probe portions of the same length and cantilever portions of the same length simultaneously.

In a method of manufacturing a cantilever chip according to the fourth aspect of the present invention, a cantilever chip having a plurality of probe portions of different aspect ratios can be formed.

In a method of manufacturing a cantilever chip according to the fifth aspect of the present invention, a cantilever chip is prevented from cracking during the manufacture, so that the yield of the cantilever chip is increased. Also, a cantilever chip having a cantilever portion of a large spring constant can be provided.

Additional objects and advantages of the invention will be set forth in the description which follows, and in part will be obvious from the description, or may De learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a perspective view of a cantilever chip for a scanning probe microscope according to the first embodiment of the present invention;

FIG. 2 is a longitudinal sectional view of the cantilever chip shown in FIG. 1;

FIG. 15 is a perspective view of a cantilever chip for a scanning probe microscope according to the third embodiment of the present invention;

FIG. 16 is a longitudinal sectional view of the cantilever chip shown in FIG. 15.

DETAILED DESCRIPTION OF THE PREFERRED EMBODIMENTS

Figure 3:
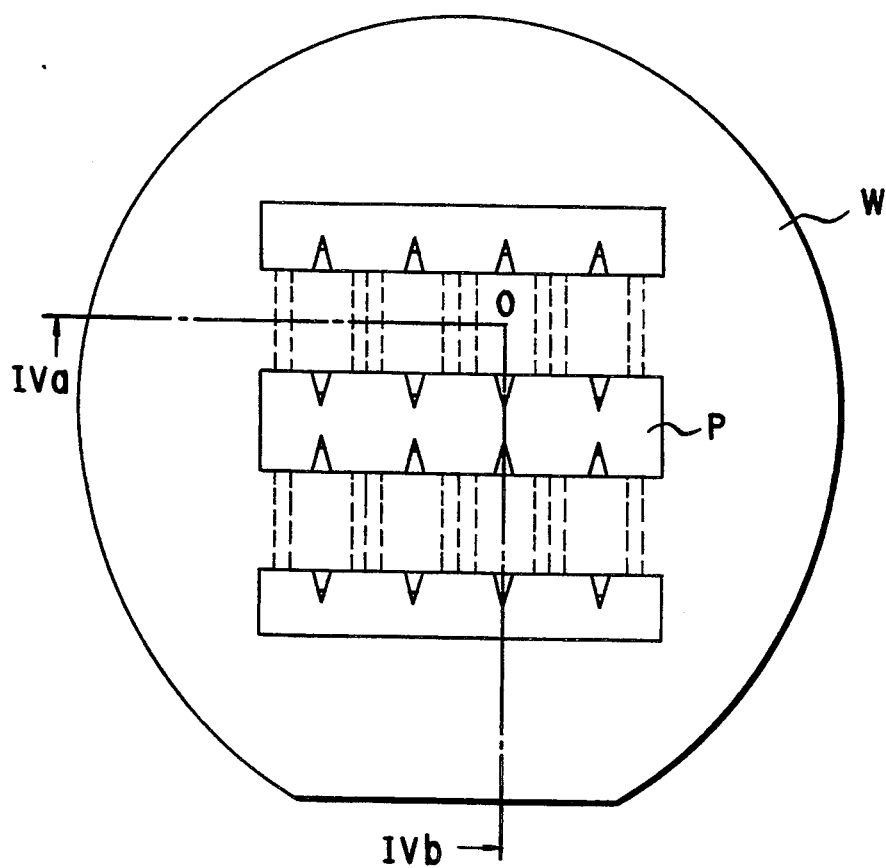
FIG. 3 shows a pattern of a plurality of cantilever chips formed in a wafer.

A cantilever chip 30 shown in FIG. 1 according to the first embodiment of the present invention has a cantilever portion 31, a probe portion 32 formed at the free end of the cantilever chip 30, and a support portion 33 of the cantilever chip 30. A surface of the cantilever portion 31 opposite to the probe portion 32 forms a mirror portion 34 for reflecting light.

FIG. 2 is a sectional view of the cantilever chip of the first embodiment of the present invention taken along the longitudinal direction at the central portion. The cantilever chip of the first embodiment of the present invention is different in shape from a conventional cantilever chip (FIGS. 12 and 13) in that a step is formed at the proximal end of the cantilever portion 31 with respect to the support portion 33.

Figure 4:
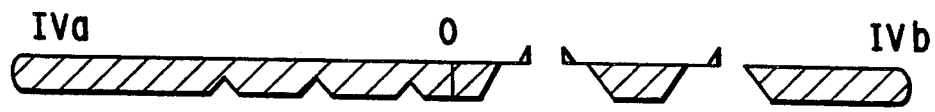
FIG. 4 is a sectional view taken along the line IVa—O—IVb of FIG. 3.

FIGS. 5A to 5K show a method of manufacturing the cantilever chip according to the first embodiment of the present invention shown in FIG. 1. FIG. 3 shows a pattern P of a plurality of cantilever chips formed in a wafer W, and FIG. 4 is a sectional view taken along the line IVa—O—IVb of FIG. 3.

Figure 5A:
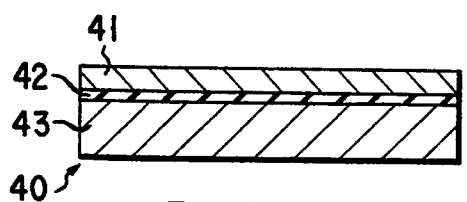
FIGS. 5A to 5K are views sequentially showing the steps in manufacturing the cantilever chip shown in FIG. 1.

The cantilever chip according to the first embodiment of the present invention uses a wafer 40 having three layers as the starting wafer, as shown in FIG. 5A. A first layer 41 is a monocrystalline silicon layer, and a second layer 42 is an etching stop layer made of silicon dioxide. A lowermost third layer 43 is a monocrystalline silicon layer.

Silicon nitride films 44 and 45 are formed on the two surfaces of the wafer 40 (FIG. 5B), and the silicon nitride film 45 on the lower surface is partially removed by photolithography. Using the remaining silicon nitride film 45 as a mask, anisotropic etching is performed by, e.g., an aqueous potassium hydroxide solution. At this time, the fact that the etching rate of this etchant is low in the (111) direction compared to a (100) plane is utilized in order to perform the anisotropic etching. That is, inclined surfaces 46 and 47 in FIG. 5C formed by this membrane manufacturing step are (111) silicon planes.

Figure 5F:
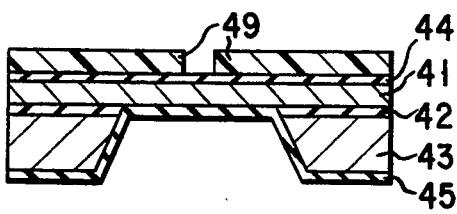
Figure 5B:
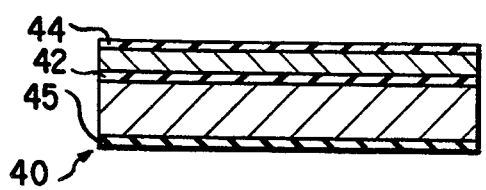
Figure 5G:
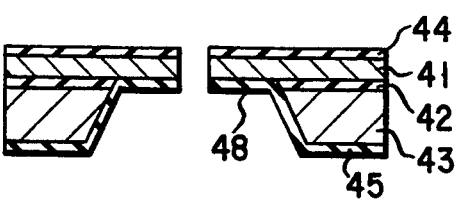
Figure 5C:
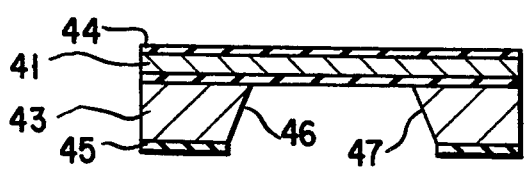

In the first embodiment of the present invention, since the silicon dioxide layer 42 as the etching stop layer is present in the wafer 40, wet etching is stopped at this layer 42 (FIG. 5C).

Figure 5H:
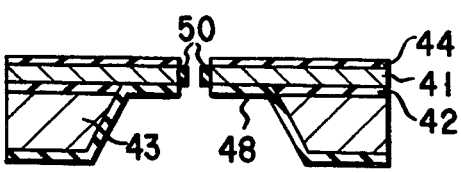
Figure 5D:
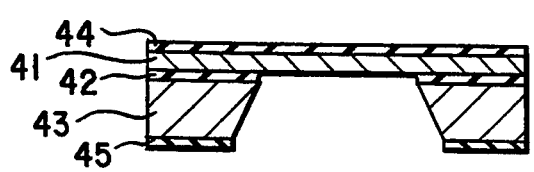
Figure 5I:
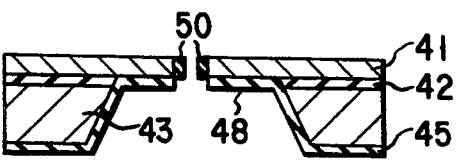

The exposed silicon dioxide layer 42 is etched by buffered hydrofluoric acid (a solution mixture of hydrofluoric acid and ammon fluoride) (FIG. 5D).

Figure 5E:
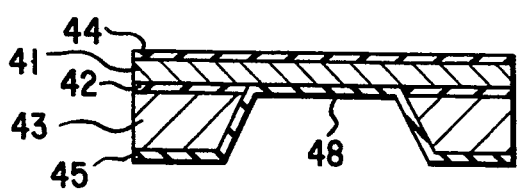

A silicon nitride film 48 is deposited on the etched portion to obtain a state as shown in FIG. 5E. Since the silicon nitride film 48 finally serves as the cantilever portion, the mechanical constants, e.g., the spring constant of the cantilever portion, that depend on the thickness of the cantilever portion are determined at this time upon formation of the film 48.

FIGS. 5F and 5G show photolithography performed from the upper surface of the wafer. First, a resist 49 is formed by coating and patterned. The membrane having the silicon nitride film 44, the silicon layer 41, and the silicon nitride film 48 is etched by plasma dry etching to form a hole extending from the upper surface to the lower surface. Shapes of the cantilever chip other than the thickness, e.g., the length and width of the cantilever chip are determined by this patterning.

Figure 5J:
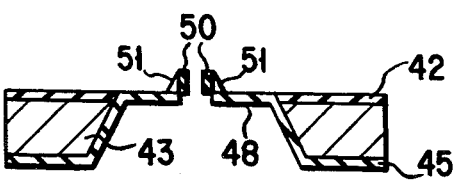

Subsequently, the silicon surface which is exposed in the previous step is oxidized to form a silicon dioxide film 50 (FIG. 5H). Thereafter, the silicon nitride film 44 on the upper side is removed by plasma dry etching (FIG. 5I), and anisotropic etching is per formed by wet etching. Etching is substantially stopped when it reaches the silicon nitride film 48 and the silicon dioxide film 50, and needle-like portions 51 having a tetrahedral structure as shown in FIG. 5J are obtained.

Figure 5K:

Finally, the silicon dioxide layer 42 is removed by buffered hydrofluoric acid to obtain cantilever chips 30a and 30b of the first embodiment of the present invention for the scanning probe microscope, as shown in FIG. 5K.

Generally, after the cantilever chips 30a and 30b are obtained, the lower surface of the cantilever portion is coated with gold or the like to form a mirror portion in order to increase the reflectivity of light of the cantilever chip and the S/N ratio of the displacement measuring system.

In the first embodiment of the present invention, the wafer used as the starting wafer having the etching stop layer is a SIMOX (Separation by Implanted Oxygen) wafer fabricated by implanting oxygen in a silicon wafer, or a bulk wafer obtained by bonding two silicon wafers by using a silicon dioxide layer as a bonding layer.

When a SIMOX wafer is the starting wafer, since the silicon layer on the upper side normally has a thickness of 1 μm or less, the SIMOX wafer is excessively thin by itself as the starting wafer of the first embodiment of the present invention. Thus, silicon is deposited by epitaxy on this silicon layer to increase its thickness.

When a bulk wafer is the starting wafer, since the silicon layer on the upper side normally has a thickness of 10 μm or more, the bulk wafer is excessively thick as the starting wafer of the present invention. Thus, the bulk wafer is polished to decrease its thickness.

More specifically, the etching stop layer is preferably closer to at least the upper surface of the starting wafer than to the lower surface. The thickness of the silicon layer on the upper side obtained by epitaxy or after polishing is selected from a range of 1 to about 30 μm, and is preferably about 1 to 5 μm.

As a material constituting the cantilever chip, a semiconductor material represented by Si or a compound derived from semiconductor materials is preferably used since the cantilever chip is manufactured in accordance with a semiconductor IC manufacturing process. A material obtained by doping such a material is also preferably similarly used.

Figure 12:
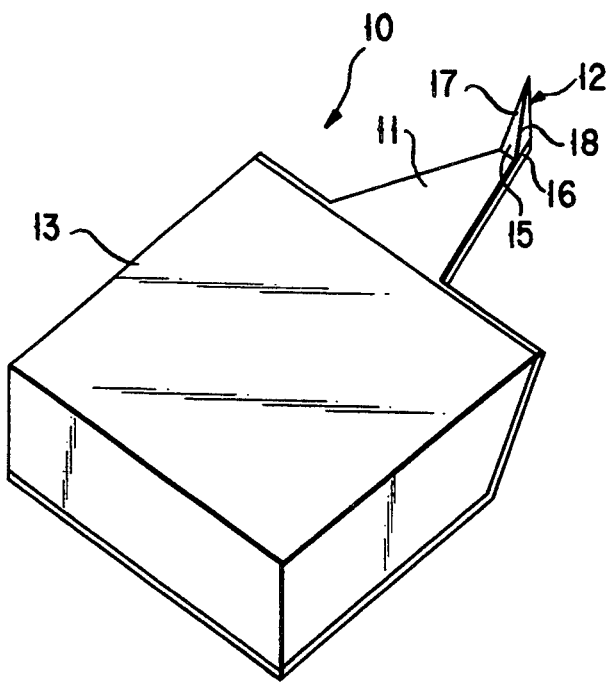
FIG. 12 is a perspective view of a conventional cantilever chip for a scanning probe microscope.
Figure 13:
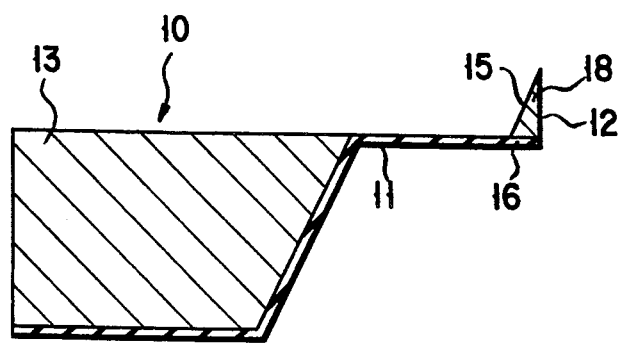
FIG. 13 is a longitudinal sectional view of the cantilever chip shown in FIG. 12.
Figure 14A:
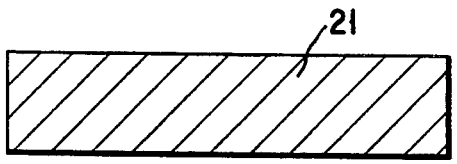
FIGS. 14A to 14H are views sequentially showing the steps in manufacturing the cantilever chip shown in FIG. 13.
Figure 14B:
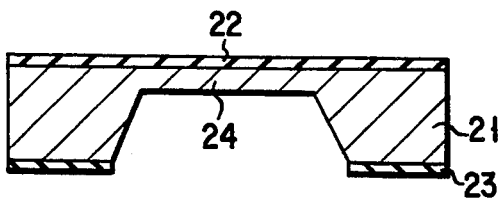
Figure 14C:
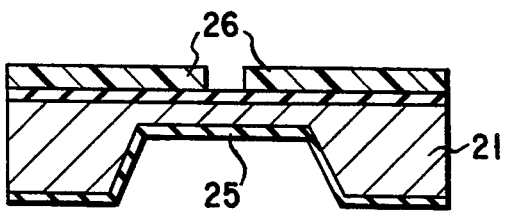
Figure 14D:
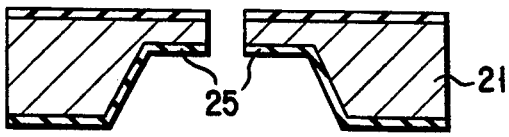
Figure 14E:
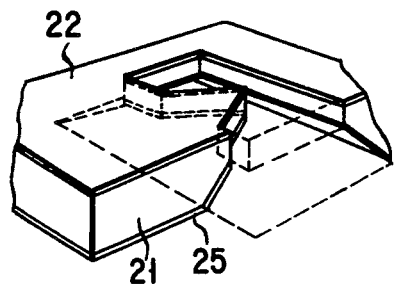
Figure 14F:
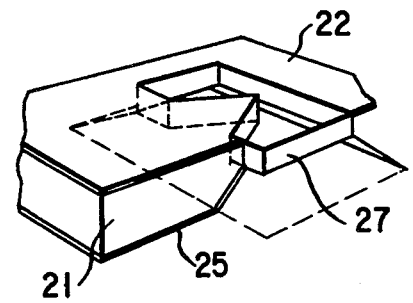
Figure 14G:
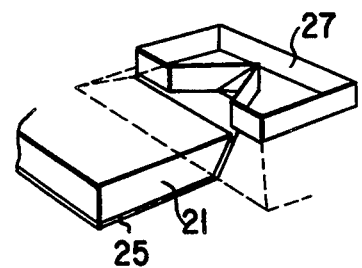
Figure 14H:
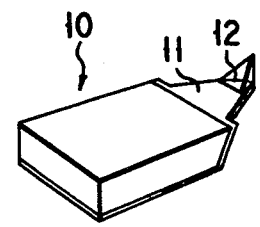

In the cantilever chip according to the first embodiment of the present invention, when a membrane having a desired thickness is to be obtained, the etching process can be stopped very easily compared to the cantilever chip shown in FIGS. 12 and 13 which is proposed by S. Akamine et al. As a result, a cantilever chip having stable quality, which is the object of the present invention, can be manufactured. Hence, a plurality of cantilever chips having probe portions of the same length at the distal ends of the cantilever portions can be simultaneously manufactured as a typical example of such a cantilever chip.

The present invention is not limited to the manufacture of cantilever chips having probe portions of the same length in the same wafer. Even if different wafers are used as the starting wafers, as far as the depths of the respective etching stop layers from the wafer surfaces are the same, cantilever chips having probe portions of the same length can be obtained.

As another effect, cantilever chips having cantilever portions of the same length can be manufactured.

The presence of the etching stop layer also influences the length of the cantilever chip when photolithography in FIGS. 5F and 5G is performed by using a two-side aligner and a plurality of cantilever chip patterns are formed such that the cantilever chips oppose each other, as shown in FIGS. 3 and 4. That is, since the area of the membrane to be formed can be controlled, the cantilever chips can be formed to have a stable length.

Since a step is formed between the cantilever portion and the support portion on the side facing a sample to be measured, as described above, contact between the sample and the support portion is decreased. From the view point of this merit, the thickness of the etching stop layer is preferably large. The present invention, however, is not limited by this thickness.

A method of manufacturing a cantilever chip according to the first embodiment of the present invention will be described by way of an example.

EXAMPLE 1

A cantilever chip as shown in FIGS. 1 and 2 according to the first embodiment of the present invention was manufactured. A method of manufacturing it was as shown in FIGS. 5A to 5K.

As the starting wafer, a SIMOX wafer 40 having a surface orientation of (100) was used. A silicon layer 41 on the upper side was set to have a thickness of 3 μm by epitaxy.

After washing the wafer 40, silicon nitride films 44 and 45 were formed on the two surfaces of the wafer 40 by an LP-CVD system (FIG. 5B). The silicon nitride film 45 on the lower surface was partially removed by photolithography, and anisotropic wet etching was performed by ethylenediamine pyrocatechol water (EPW) by using the remaining silicon nitride film 45 as the mask.

The etching time was not specifically controlled. The wafer 40 was left in the EPW over an etching time needed for obtaining a desired membrane thickness which was calculated from an etching rate obtained by a preliminary experiment. However, because of the presence of a silicon dioxide layer 42 in the SIMOX wafer 40, wet etching was stopped by the layer 42.

The silicon dioxide layer 42 was etched by buffered hydrofluoric acid (a solution mixture of hydrofluoric acid and ammon fluoride).

A silicon nitride film 48 was deposited to a thickness of 400 nm by LP-CVD. A thick resist 49 was formed to coat the surface of the wafer 40, and patterned. Subsequently, the membrane was etched by RIE plasma dry etching using a $CBrF_3$ gas to form a hole extending from the upper surface to the lower surface of the wafer 40.

The obtained structure was placed in a diffusion furnace to form a silicon dioxide film 50 on the silicon surface exposed by the RIE process.

Thereafter, the silicon nitride film 44 on the upper side was removed by plasma dry etching. The silicon layer 41 was subjected to anisotropic wet etching by the EPW. Subsequently, the silicon dioxide film 42 was removed by buffered hydrofluoric acid. Finally, the lower surface of the cantilever portion is coated with chromium and gold by vacuum deposition to form a mirror portion, thus obtaining a cantilever chip for a scanning probe microscope according to the first embodiment of the present invention.

in the cantilever chip of the first embodiment of the present invention obtained in this manner, probe portions having the same length were formed at the distal ends of the respective cantilever portions in the same wafer, and a plurality of cantilever chips having stable quality were simultaneously obtained.

Figure 6:
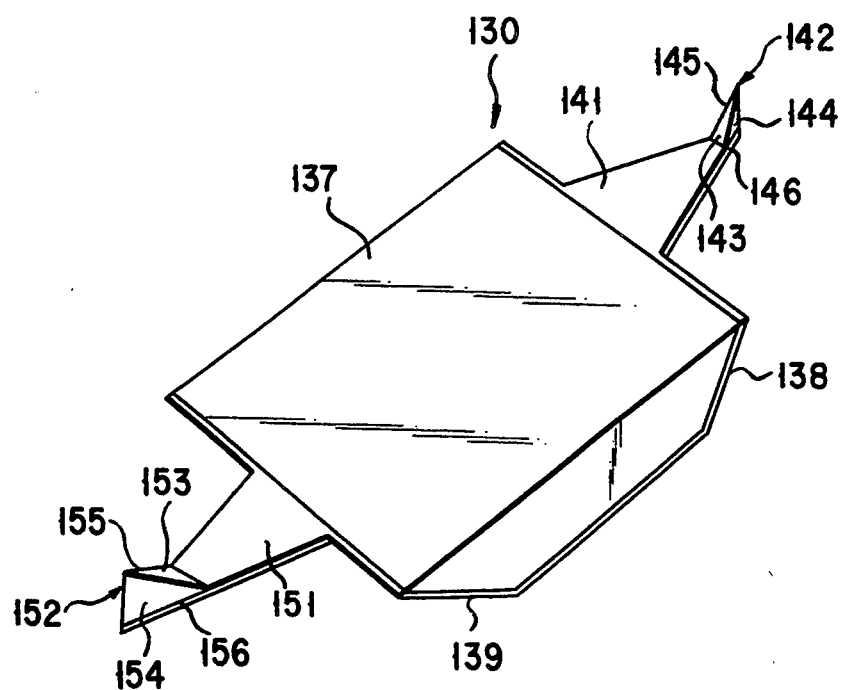
FIG. 6 is a perspective view of a cantilever chip for a scanning probe microscope according to the second embodiment of the present invention.

FIG. 6 is a perspective view of a cantilever for the scanning probe microscope according to the second embodiment of the present invention.

A cantilever chip 130 shown in FIG. 6 according to the second embodiment of the present invention has cantilever portions 141 and 151, probe portions 142 and 152 provided at the free ends of the respective cantilever portions, and a support portion 137 for the cantilever portions 141 and 151. Surfaces of the cantilever portions 141 and 151 opposite to the probe portions form mirror portions to reflect light.

Figure 7:
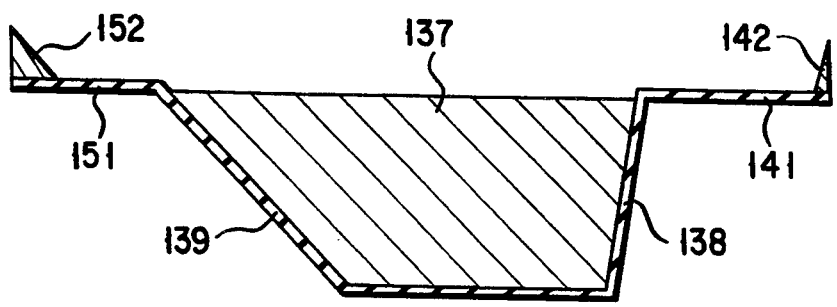
FIG. 7 is a longitudinal sectional view of the cantilever chip shown in FIG. 6.

FIG. 7 is a sectional view of the cantilever chip according to the present invention taken along the longitudinal direction. When the cantilever chip of the present invention is compared with the conventional cantilever chip (FIGS. 12 and 13), they are different in shape in that, in the form, two pairs of cantilever portions and probe portions are provided to one support portion and the two probe portions have different shapes.

Surfaces 143 and 153 constituting the respective probe portions form different angles together with the corresponding cantilever portions 141 and 151. Both the surfaces 143 and 153 have (111) planes, and they define an angle of 70.52°. The probe portion 142 has a small vertex angle and a large aspect ratio, while the probe portion 152 has a large vertex angle and a small aspect ratio In this manner, in the cantilever chip according to second embodiment of the present invention, a plurality of cantilever portions having probe portions of different aspect ratios are provided to the same cantilever chip, and the user can selectively use a desired cantilever portion.

Similarly, both surfaces 139 and 138 have the (111) planes when considering the starting wafer as the reference and intersect with the corresponding cantilever portions at different angles.

Figure 8:
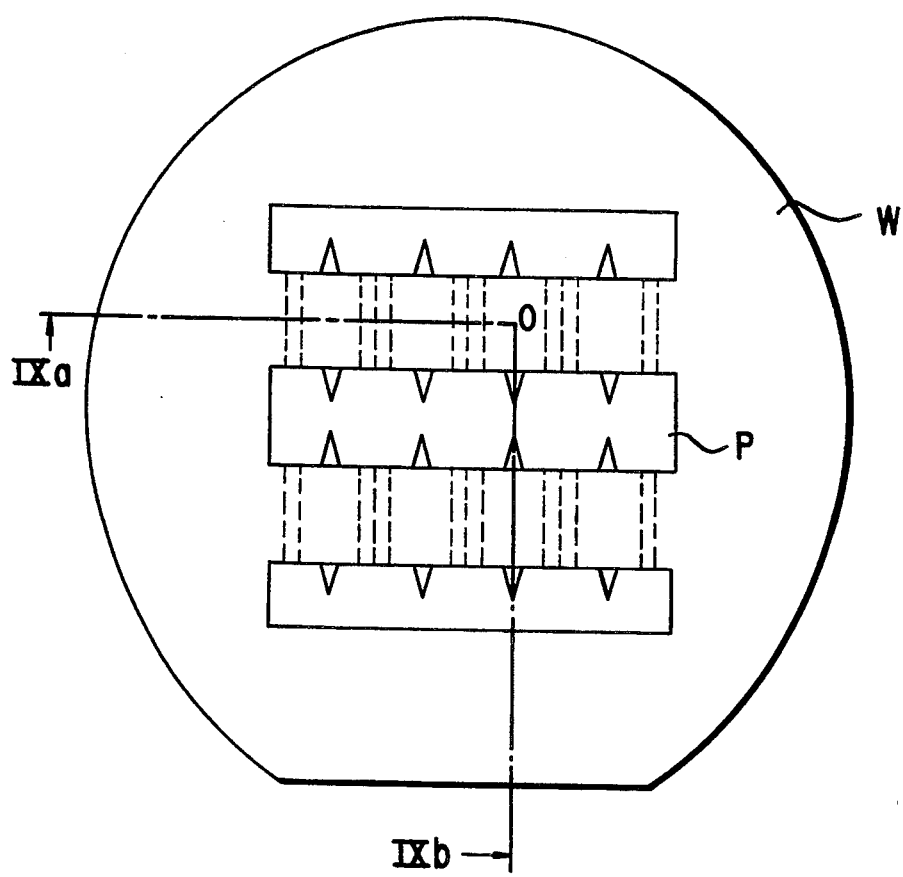
FIG. 8 shows a pattern of a plurality of cantilever chips formed in a wafer.
Figure 9:
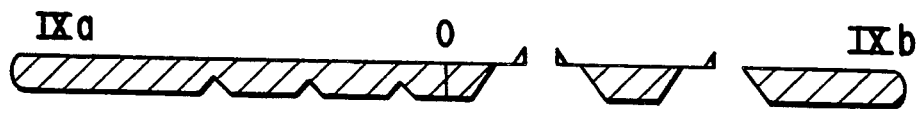
FIG. 9 is a sectional view taken along the line IXa—O—IXb of FIG. 8.

FIGS. 10A to 10L show a method of manufacturing the cantilever chip according to the second embodiment of the present invention shown in FIG. 6. FIG. 8 shows a pattern P of a plurality of cantilever chips formed in a wafer w, and FIG. 9 is a sectional view taken along the line IXa—O—IXb of FIG. 8.

Figure 10A:
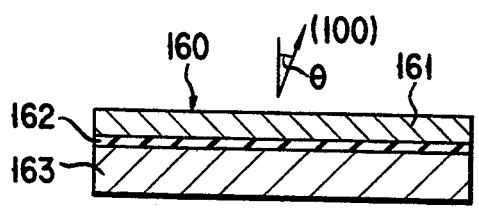
FIGS. 10A to 10L are views sequentially showing the steps in manufacturing the cantilever chip shown in FIG. 6.

The cantilever chip according to the second embodiment present invention uses a wafer 160 having three layers as the starting wafer, as shown in FIG. 10A. A first layer 161 is a monocrystalline silicon layer having a thickness of several to several tens of $\mu$m. A second layer 162 is an etching stop layer made of silicon dioxide. A lowermost third layer 163 is a monocrystalline silicon layer. The surface orientation of the wafer 160 is inclined from a (100) surface at an angle of $\theta$.

Silicon nitride films 164 and 165 are formed on the two surfaces of the wafer 160 (FIG. 10B), and the silicon nitride film 165 on the lower surface is partially removed by photolithography. Using the remaining silicon nitride film 165 as a mask, anisotropic etching is performed by, e.g., an aqueous potassium hydroxide solution. At this time, the fact that the etching rate of this etchant is low in-the (111) direction compared to a (100) plane is utilized in order to perform the anisotropic etching. That is, inclined surfaces 176, 177,178, and 179 in FIG. 10C formed by this membrane manufacturing step are (111) silicon planes.

Figure 10G:
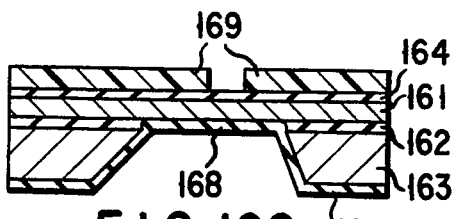
Figure 10B:
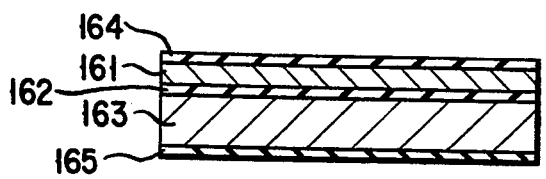
Figure 10H:
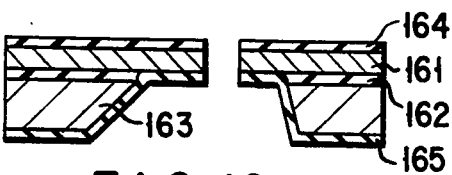
Figure 10C:
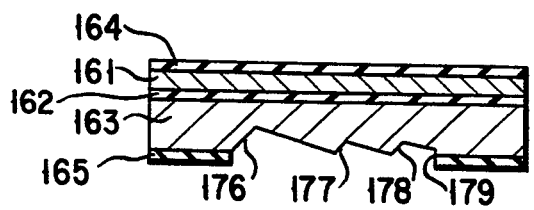
Figure 10I:
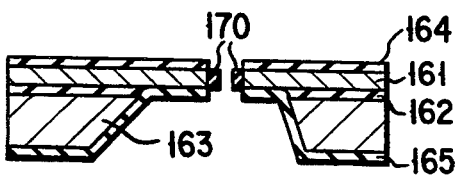
Figure 10D:
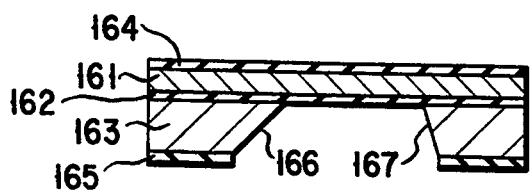
Figure 10J:
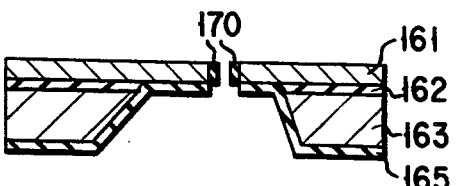

In the present invention, since the silicon dioxide layer 162 as the etching stop layer is present in the wafer 160, wet etching is stopped at this layer 162 (FIG. 10D). Accordingly, the steps formed FIG. 10C are removed. Inclined surfaces 166 and 167 have (111) planes. The surfaces 166 and 168 are inclined at different angles with respect to the wafer surface because a wafer whose orientation is inclined at an angle of $\theta$ with respect to the (100) plane is used as the starting wafer.

Figure 10E:
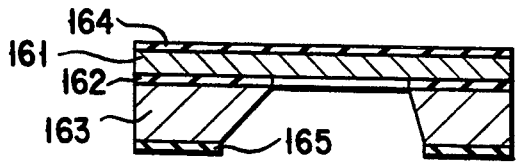

The exposed silicon dioxide layer 162 is etched by buffered hydrofluoric acid (a solution mixture of hydrofluoric acid and ammon fluoride) (FIG. 10E).

Figure 10K:
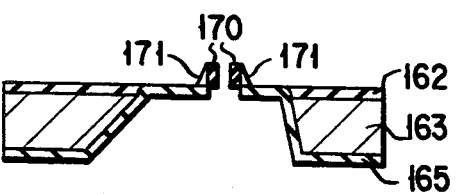
Figure 10F:
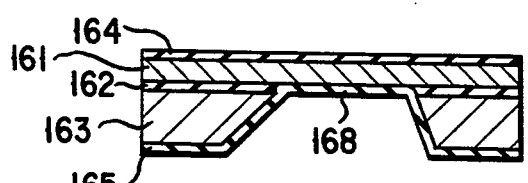

A silicon nitride film 168 is deposited on the etched portion to obtain a state as shown in FIG. 10F. Since the silicon nitride film 168 finally serves as the cantilever portion, the mechanical constants, e.g., the spring constant of the cantilever portion, that depend on the thickness of the cantilever portion are determined at this time upon formation of the film 168.

FIGS. 10G and 10H show photolithography performed from the upper surface of the wafer. First, a resist 169 is formed by coating and patterned. The membrane having the silicon nitride film 164, the silicon layer 161, and the silicon nitride film 168 is etched by plasma dry etching to form a hole extending from the upper surface to the lower surface. Shapes of the cantilever chip other than the thickness, e.g., the length and width of the cantilever chip are determined by this patterning.

Subsequently, the silicon surface which is exposed in the previous step is oxidized to form a silicon dioxide film 170 (FIG. 10I). Thereafter, the silicon nitride film 164 on the upper side is removed by plasma dry etching (FIG. 10J), and anisotropic etching is performed by wet etching. Etching is substantially stopped when it reaches the silicon nitride film 168 and the silicon dioxide film 170, and needle-like portions 171 having a tetrahedral structure as shown in FIG. 10K are obtained.

Figure 10L:
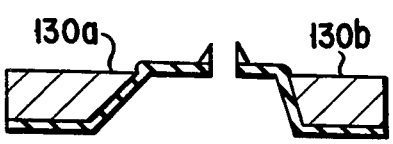

Finally, the silicon dioxide layer 162 is removed by buffered hydrofluoric acid to obtain cantilever chips 130a and 130b of the present invention for the scanning probe microscope, as shown in FIG. 10L. Although separated in two parts, FIG. 10L shows cantilever portions and probe portions on two sides of one cantilever chip. Since a plurality of cantilever chips are fabricated from one wafer, as shown in FIGS. 8 and 9, the cantilever chips 130a and 130b represent part of cantilever chips adjacent to each other.

Generally, after the cantilever chips 130a and 130b are obtained, the lower surface of the cantilever portion is coated with gold or the like to form a mirror portion in order to increase the reflectivity of light of the cantilever chip surface and the S/N ratio of the displacement measuring system.

In the second embodiment of the present invention, a monocrystalline wafer, e.g., a monocrystalline silicon wafer is used as the starting wafer.

S. Akamine et al. fabricate the conventional cantilever portions by using silicon having the (100) plane. In contrast to this, in the present invention, a wafer having a surface orientation inclined at an angle $\theta$ with respect to the (100) plane, if the wafer is a silicon wafer, is used as the starting wafer. The angle $\theta$ can be any value as far as the probe portion surfaces 143 and 153 of FIG. 6 can be formed in accordance with the process described above. Since an angle defined by the (111) plane and the (100) plane is 54.74°, it is theoretically allowable if the angle $\theta$ is 35.26° ($=90°-54.74°$) or less. From the view point of the mechanical strength of each probe portion, the angle $\theta$ is preferably 30° or less.

When probe portions having different aspect ratios are to be formed, in order to increase this difference, a wafer having a large angle $\theta$ need be used. In this case, the starting wafer used in the present invention preferably has an etching stop layer within the wafer. This will be described with reference to FIGS. 11A and 11B.

Figure 11A:
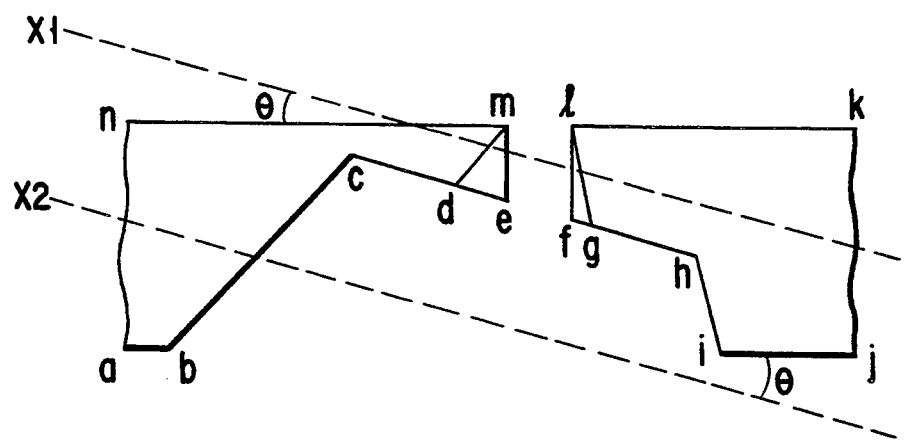
FIGS. 11A and 11B are schematic views showing a difference in state of a wafer not having an etching stop layer and a wafer having an etching stop layer during a manufacturing process.
Figure 11B:
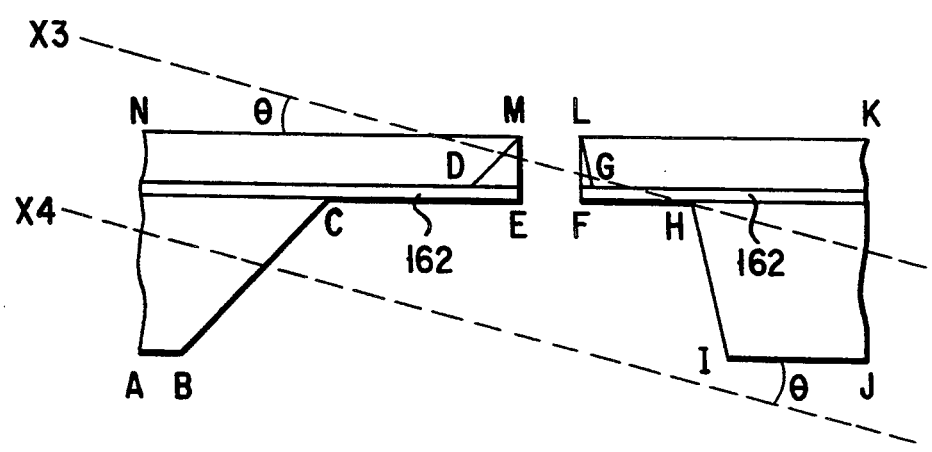

FIGS. 11A and 11B show states during the process with auxiliary lines X1 to X4 for explanation being added. In each of FIGS. 11A and 11B, a wafer inclined at an angle $\theta$ with respect to the (100) plane is used as the starting wafer. In FIG. 11A, a wafer having no etching stop layer is used, and in FIG. 11B, a wafer having an etching stop layer 162 is used.

When a wafer having no etching stop layer is used, as shown in FIG. 11A, since etching for forming a membrane advances at a point c farther than at a point h, the membrane is inclined compared to the wafer surface. Accordingly, it is further difficult to control anisotropic wet etching even compared with the conventional case. Furthermore, when the process is allowed to proceed in this manner, the cantilever portion of the cantilever chip on the left side has a shape obtained by tracing points a and b, the point c, and points d and e, and the cantilever portion of the cantilever chip on the right side substantially has a shape obtained by tracing points f and g, the point h, and points i and j. In most of the current AFMs, when a cantilever chip is mounted on the AFM by connection of a lower surface, such as the surface formed between the points a and b, the cantilever chip is set to be inclined in order to avoid contact of the cantilever chip with the sample. However, if cantilever portions have shapes as described above, the cantilever chip must be further inclined, leading to a problem.

In contrast to this, when the wafer having the etching stop layer 162 is used as the starting wafer, as shown in FIG. 11B, this problem can be avoided. More specifically, even if the membrane is formed by anisotropic wet etching, etching is stopped by the surface defined by points C, E, F, and H. Therefore, even if the process is allowed to proceed, only the shape or aspect ratio of the probe portion is changed. As a result, a cantilever chip in which the cantilever portion surface and the wafer surface are parallel with each other, as in the conventional one, can be fabricated.

As a wafer having such an etching stop layer, a SIMOX (Separation by Implanted Oxygen) wafer obtained by implanting oxygen or a bulk wafer obtained by bonding two silicon wafers through a silicon dioxide layer as the bonding layer can be preferably used. Both of these wafers have features in that silicon dioxide is sandwiched by monocrystalline silicon.

When a SIMOX wafer is the starting wafer, since the silicon layer on the upper side normally has a thickness of 1 $\mu$m or less, the SIMOX wafer is excessively thin by itself as the starting wafer of the present invention. Thus, silicon is deposited by epitaxy on this silicon layer to increase its thickness.

When a bulk wafer is the starting wafer, since the silicon layer on the upper side normally has a thickness of 10 $\mu$m or more, the bulk wafer is excessively thick as the starting wafer of the present invention. Thus, the bulk wafer is polished to decrease its thickness.

More specifically, the etching stop layer is preferably closer to at least the upper surface of the starting wafer than to the lower surface. The thickness of the silicon layer on the upper side obtained by epitaxy or after polishing is selected from a range of 1 to about 30 $\mu$m, and is preferably about 1 to 5 $\mu$m.

As a material constituting the cantilever chip, a semiconductor material represented by Si or a compound derived from semiconductor materials is preferably used since the cantilever chip is manufactured in accordance with a semiconductor IC manufacturing process. A material obtained by doping such a material is also preferably similarly used.

According to the present invention, when compared to the cantilever chip shown in FIGS. 12 and 13 proposed by S. Akamine et al., cantilever chips having a plurality of probe portions of different aspect ratios can be provided, and the user can selectively use a cantilever portion having a probe portion with an aspect ratio suitable for a sample to be measured.

As a secondary effect obtained when a wafer having an etching stop layer is used as the starting wafer, the lengths of the probe portions to be manufactured can be set the same. The length of the probe portion influences the reproducibility of the surface shape of the sample of an AFM image. If the length of the probe portion is excessively long, a moment applied on the probe portion upon reception of a force perpendicular to the axial direction of the probe portion becomes large, and the AFM image does not correctly reproduce the surface shape of the sample.

The thickness of the membrane is the final length of the probe portion. If a wafer having an etching stop layer is not used, it is difficult to control the thickness of the membrane, as shown in FIG. 11A. In this case, probe portions having different lengths are formed in individual wafers, or even if the same wafer is used, probe portions having different lengths are formed due to the wafer surface distribution of the etching rate.

In contrast to this, when an wafer having an etching stop layer is used, since the thickness of the silicon layer on the etching stop layer is predetermined, probe portions of the same length can be obtained at least within the same wafer. Even if a plurality of wafer are used, cantilever chips having probe portions of the same length can be obtained by employing a method that can perform thickness control as a method of forming a silicon layer to form a membrane.

A method of manufacturing a cantilever chip according to the second embodiment of the present invention will be described by way of an example.

EXAMPLE 2

A cantilever chip as shown in FIGS. 6 and 7 according to the second embodiment of the present invention was manufactured. A method of manufacturing it was as shown in FIGS. 10A to 10L.

As the starting wafer, a SIMOX wafer 160 having a surface orientation inclined from the (100) plane at 14° was used. A silicon layer 161 on the upper side was set to have a thickness of 3 μm by epitaxy.

After washing the wafer 160, silicon nitride films 164 and 165 were formed on the two surfaces of the wafer 160 by the LP-CVD system (FIG. 10B). The silicon nitride film 165 on the lower surface was partially removed by photolithography, and anisotropic wet etching was performed by ethylenediamine pyrocatechol water (EPW) by using the remaining silicon nitride film 165 as the mask.

The etching time was not specifically controlled. The wafer 160 was left in the EPW over an etching time needed for obtaining a desired membrane thickness which was calculated from an etching rate obtained by a preliminary experiment. However, because of the presence of a silicon dioxide layer 162 in the SIMOX wafer 160, wet etching was stopped by the layer 162.

The silicon dioxide layer 162 was etched by buffered hydrofluoric acid (a solution mixture of hydrofluoric acid and ammon fluoride).

A silicon nitride film 168 was deposited to a thickness of 400 nm by LP-CVD. A thick resist 169 was formed to coat the surface of the wafer 160, and patterned. Subsequently, the membrane was etched by RIE plasma dry etching using a $CBrF_3$ gas to form a hole extending from the upper surface to the lower surface of the wafer 160.

The obtained structure was placed in a diffusion furnace to form a silicon dioxide film 170 on the silicon surface exposed by the RIE process.

Thereafter, the silicon nitride film 164 on the upper side was removed by plasma dry etching. The silicon layer 161 was subjected to anisotropic wet etching by the EPW. Subsequently, the silicon dioxide film 162 was removed by buffered hydrofluoric acid. Finally, the lower surface of the cantilever portion is coated with chromium and gold by vacuum deposition to form a mirror portion, thus obtaining a cantilever chip for the scanning type probe microscope according to the second embodiment of the present invention.

In the cantilever chip of the second embodiment of the present invention obtained in this manner, probe portions having the same length were formed at the distal ends of the respective cantilever portions in the same wafer. Furthermore, probe portions having different aspect ratios were formed on the two sides of the cantilever chip to reflect the inclination of the starting wafer surface.

FIG. 15 is a perspective view of a cantilever chip for a scanning microscope according to the third embodiment of the present invention.

A cantilever chip 60 shown in FIG. 15 according to the present invention has a cantilever portion 60, a probe portion 62 provided at the free end of the cantilever chip 60, and a support portion 63 of the cantilever chip 60. A surface of the cantilever portion 61 opposite to that where the probe portion 62 is provided forms a mirror portion for reflecting light. The probe portion 62 is tetrahedral as in the conventional cantilever chip (FIGS. 12 and 13). Accordingly, the distal end of the probe portion 62 is very sharp.

FIG. 16 is a sectional view of the cantilever chip according to the third embodiment of the present invention taken along the longitudinal direction at the central portion. The lever portion 61 is made of silicon heavily doped with boron (B), and the probe portion 62 is made of non-doped silicon. The support portion 63 is made of non-doped silicon, and an extended portion of the cantilever portion 61, i.e., a layer made of silicon heavily doped with boron (B) is formed on a surface of the support portion 63.

When the cantilever portion 61 made of silicon heavily doped with boron is thin, light is undesirably transmitted therethrough and a sufficient reflectance cannot be obtained by using an optical displacement detector which is normally used for AFM measurement. The mirror portion 64 is formed in such a case by coating the cantilever portion 61 with, e.g., gold. If a sufficient reflectance can be obtained even without coating, this coating can be omitted.

FIGS. 17A to 17I show the steps in manufacturing the cantilever chip according to the third embodiment of the present invention. The steps in manufacturing this cantilever chip will be described below by way of examples.

EXAMPLE 3

Figure 17A:
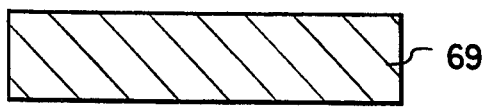
FIGS. 17A to 17I are views sequentially showing the steps in manufacturing the cantilever chip shown in FIG. 15.
Figure 17F:
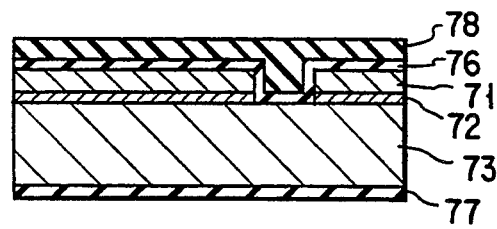
Figure 17B:
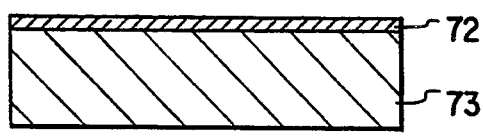
Figure 17G:
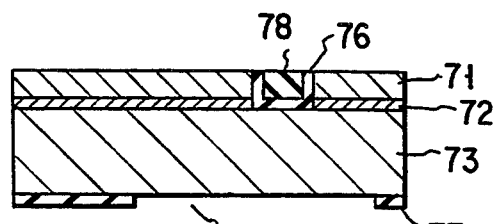
Figure 17C:
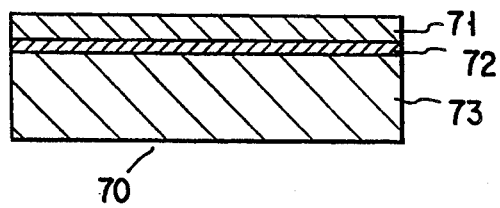

A starting wafer 70 of the third embodiment of the present invention has a silicon layer 72 heavily doped ($10^{18}$ ions/cm$^3$) with boron (B), as shown in FIG. 17C. Non-doped silicon layers 71 and 73 each having a surface orientation of about (100) are formed on the upper and lower surfaces of the silicon layer 72.

In order to form the starting wafer 70, a normal silicon wafer 69 having a surface orientation of (100) and a thickness of 525 μm is used (FIG. 17A), and boron (B) is implanted in its major surface, thus forming a boron-doped and non-doped layers 72 and 73 (FIG. 17B). Boron is doped by, e.g., ion implantation, and the thickness of the layer 72 is set to about 600 nm.

The layers 72 and 73 are annealed, and a silicon layer is formed on the layer 72 by epitaxy to a thickness of about 5 μm, thus forming the non-doped layer 71 (FIG. 17C). As a result, the starting wafer is completed.

Figure 17H:
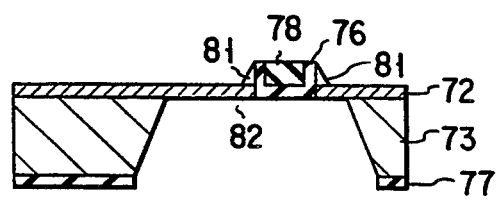
Figure 17D:
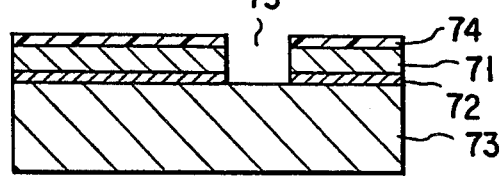

A resist 74 is formed on the layer 71 by coating to form a substantially triangular cantilever form and patterned. Reactive ion etching (RIE) is performed by using an $SF_6+C_2BrF_5$ gas to substantially vertically etch the layers 71 and 72 until the surface of the layer 73 is exposed, thereby forming a hole 75 (FIG. 17D).

The resist 74 is removed, and silicon oxide films 76 and 77 are formed on the upper surface (including the inner surface of the hole) and the lower surface, respectively, of the resultant structure by annealing (FIG.

17E). An SOG film 78 is formed on the oxide film 76 by spin coating and planarized (FIG. 17F). The SOG film 78 is mainly made of silicon oxide after cured.

Plasma dry etching is performed to etch back the oxide films 76 and the SOG film 78 on the upper surface while leaving portions of the oxide film 76 and the SOG film 78 present in the hole 75. Simultaneously, the oxide film 77 on the lower surface is patterned to form a square opening 79 (FIG. 17G).

The non-doped silicon layers 71 and 73 on the upper and lower sides are etched in accordance with anisotropic wet etching using an aqueous potassium hydroxide solution. At this time, the silicon layer 72 heavily doped with boron (B) and the oxide film 76 serve as a stopping layer on the upper side against etching using the aqueous potassium hydroxide solution to form tetrahedral needle-like portions 81, as shown in FIG. 17H. The oxide film 77 serves as the mask on the lower side, and the silicon layer 72 and the oxide film 76 serve as an etching stop layer, so that a membrane 82 as shown in FIG. 17H is formed.

Figure 17I:
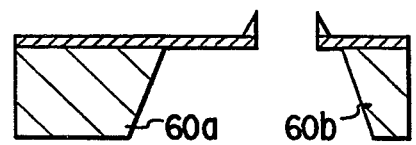

Finally, the remaining portions of the oxide film 76 and the SOG film 78 are removed by buffered hydrofluoric acid, thereby obtaining cantilever chips 60a and 60b for the scanning probe microscope according to the third embodiment of the present invention, as shown in FIG. 17I.

When the steps of forming the membrane are performed as final steps in the whole process, as in Example 3, the wafer can be prevented from cracking during the manufacturing process, and the yield of the cantilever chip is increased.

After boron is heavily doped, when a silicon layer is formed by epitaxy, since the vapor pressure of boron is generally high, boron is fetched in the silicon layer 71 during its formation by a mechanism called autodoping. As a result, boron is distributed toward the surface of the structure, and the etching stop position is deviated to the surface side of the structure. Considering this, the silicon layer 71 formed by epitaxy preferably has a thickness of about 1 $\mu$m or more in order to maintain the probe length. Although the boron concentration of the silicon layer 72 is about $10^{18}$ ions/cm$^3$ or more, the present invention is not limited to this.

The silicon layers 71 and 73 on the upper and lower sides of boron-doped layer 72 can be layers doped with boron of less than $10^{18}$ ions/cm$^3$, or layers of n-conductivity type.

Figure 17E:
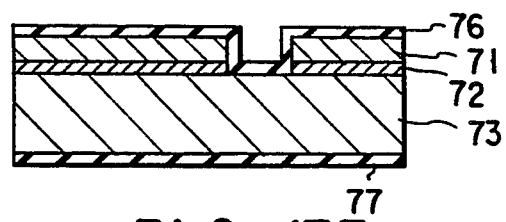

When the oxide films 76 and 77 shown in FIG. 17E are formed at a low temperature of 950° C., the probe can be made sharp. In addition, since low-temperature annealing at about 950° C. does not much influence boron diffusion, it is preferable as a method of forming an oxide film. Silicon nitride films can be used in place of the oxide films 76 and 77. In this case, removal of the oxide film by hydrofluoric acid is substituted by removal of the nitride film by hot phosphoric acid. In place of SOG used in the step shown in FIG. 17F, another material, e.g., resist which is cured at a low temperature can be used.

EXAMPLE 4

In Example 3 described above, since the boron-doped silicon layer 72 is formed by ion implantation, the thickness of the cantilever portion 61 has a thickness of about 600 nm. However, in Example 4, in order to manufacture a thicker cantilever portion, a starting wafer having a 12 $\mu$m thick boron-doped silicon layer 72 is used.

A normal silicon wafer 69 having a surface orientation of (100) and a thickness of 525 $\mu$m is used (FIG. 17A), and a boron film (B type available from Emulsitone Co.) is formed as a high-concentration boron diffusion source on the major surface of the wafer by spin coating. Subsequently, the wafer is annealed at 1190° C. for 50 hours to form the silicon layer 72 heavily doped with boron. A silicon layer is formed on the layer 72 by epitaxy, thus completing the starting wafer 70.

By using the starting wafer 70 thus completed, a cantilever chip according to the third embodiment of the present invention shown in FIG. 15 is manufactured following substantially the same procedures as in Example 3 described above. Although the resist 74 is used as the mask in Example 3 to form the hole 75 by RIE, a metal mask made of nickel is used in Example 4.

According to Example 4, a cantilever chip for the scanning probe microscope having a cantilever portion 61 with a thickness of 10 $\mu$m or more and a very large spring constant can be provided.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of manufacturing a plurality of cantilever chips for a scanning probe microscope simultaneously, each of said cantilever chips comprising:
    a cantilever portion,
    a probe portion formed at a free end of said cantilever portion, and
    a support portion for supporting a proximal end of said cantilever portion, the method comprising the steps of:
    preparing a starting wafer, said starting wafer including an etching stop layer, a first semiconductor layer arranged on to an upper surface of said etching stop layer, and a second semiconductor layer arranged on to a lower surface of said etching stop layer;
    etching part of said second semiconductor layer of said wafer until reaching said etching stop layer, and decreasing a thickness of a portion of said wafer corresponding to said etched portion to fabricate a membrane;
    etching and removing an exposed part of said etching stop layer;
    depositing a constituent material of said cantilever portion on an exposed portion of said first semiconductor layer which is exposed by removing part of said etching stop layer, and part of said second semiconductor layer on two sides thereof, thereby forming a prospective cantilever portion layer;
    patterning part of a resultant structure to form a hole extending through said membrane;
    oxidizing a surface portion of said second semiconductor layer exposed in the hole to form an oxide film;
    etching said first semiconductor layer until etching is stopped by said prospective cantilever portion layer and said oxide film, thereby forming a needle-like portion on said prospective cantilever portion layer; and
    removing said oxide film.

2. A method according to claim 1, wherein said second semiconductor layer has a thickness larger than that of said first semiconductor layer.

3. A method according to claim 1, wherein each of said first and second semiconductor layers is made of a monocrystalline layers or a doped monocrystalline layers.

4. A method according to claim 3, wherein said first and second semiconductor layers are made of silicon, and said etching stop layer is made of a silicon dioxide.

5. A method according to claim 1, wherein:
said first semiconductor layer is made of one of a monocrystalline layer and a doped monocrystalline layer, and wherein a surface orientation of said first semiconductor layer is inclined from a (100) plane; and
said cantilever chip thus fabricated comprises:
first and second cantilever portions,
first and second probe portions formed at free ends of said first and second cantilever portions, respectively, and
one support portion for supporting proximal ends of said first and second cantilever portions, wherein said first and second probe portions have different aspect ratios.

6. A method according to claim 5, wherein an inclination of the surface orientation of said first semiconductor layer is not more than 30°.

7. A method according to claim 5, wherein said second semiconductor layer is made of one of a monocrystalline layer and a doped monocrystalline layer and has the same surface orientation as that of the first semiconductor layer.

8. A method according to claim 7, wherein said second semiconductor layer has a thickness larger than that of said first semiconductor layer.

9. A method according to claim 1, wherein said constituent material of said cantilever portion is silicon nitride.

10. A method of manufacturing a plurality of cantilever chips for a scanning probe microscope simultaneously, each of said cantilever chips comprising:
a cantilever portion,
a probe portion formed at a free end of said cantilever portion, and
a support portion for supporting a proximal end of said cantilever portion, the method comprising the steps of:
preparing a starting wafer, said starting wafer including an etching stop layer, a first semiconductor layer arranged on to an upper surface of said etching stop layer, and a second semiconductor layer arranged on to a lower surface of said etching stop layer;
etching part of said first semiconductor layer and part of said etching stop layer of said wafer from an upper surface until reaching said second semiconductor layer, thereby forming a hole extending through said first semiconductor layer and said etching stop layer;
forming an oxide film on surfaces of said first and second semiconductor layers exposed in and out of the hole;
removing said oxide film except for part thereof formed in the hole;
etching part of said second semiconductor layer from a lower surface until reaching said etching stop layer to decrease a thickness of a portion of said wafer corresponding to the hole, thereby fabricating a membrane;
etching said first semiconductor layer until etching is stopped by said etching stop layer and said oxide film, thereby forming a needle-like portion on said etching stop layer; and
removing said oxide film.

11. A method according to claim 10, wherein said first and second semiconductor layers are made of monocrystalline layers.

12. A method according to claim 11, wherein said first and second semiconductor layers are made of silicon, and said etching stop layer is made of silicon doped with boron.

13. A method of manufacturing a cantilever chip for a scanning probe microscope, said cantilever chip comprising:
a cantilever portion,
a probe portion formed at a free end of said cantilever portion, and
a support portion for supporting a proximal end of said cantilever portion, the method comprising the steps of:
preparing a starting wafer, said starting wafer including an etching stop layer, a first semiconductor layer arranged on an upper surface of said etching stop layer, and a second semiconductor layer arranged on a lower surface of said etching stop layer; and
forming said cantilever chip by etching said first and second semiconductor layers toward said etching stop layer from their distal surfaces to leave said probe portion.

14. A method according to claim 13, wherein said first semiconductor layer is made of one of a monocrystalline layer and a doped monocrystalline layer.

15. A method according to claim 14, wherein a surface orientation of said first semiconductor layer is inclined from a (100) plane.

16. A method according to claim 15, wherein said surface orientation is inclined from the plane (100) by not more than 30°.

17. A method according to claim 16, wherein said first and second semiconductor layers are made of silicon, and said etching stop layer is made of a silicon dioxide.

18. A method according to claim 13, wherein said cantilever portion is made of silicon nitride.

* * * * *